United States Patent
Chen (10) Patent No.: US 7,376,450 B2
(45) Date of Patent: May 20, 2008

(54) SLIDABLE AND AUTOMATIC ROTATABLE APPARATUS

(75) Inventor: Hsiao-Wu Chen, Pingjen (TW)

(73) Assignee: BenQ Corporation, Taoyuan Shien (TW)

( * ) Notice: Subject to any disclaimer, the term of this patent is extended or adjusted under 35 U.S.C. 154(b) by 461 days.

(21) Appl. No.: 11/214,906

(22) Filed: Aug. 31, 2005

(65) Prior Publication Data

US 2006/0046797 A1    Mar. 2, 2006

(30) Foreign Application Priority Data

Aug. 31, 2004    (TW) .............................. 93126262 A (51) Int. Cl.
*H04M 1/00* (2006.01)
(52) U.S. Cl. ............................. 455/575.4; 455/575.1; 455/90.3; 455/575.8; 379/330; 379/433.13
(58) Field of Classification Search ............ 455/575.4, 455/575.1, 575.8, 90.3; 370/330, 433.13
See application file for complete search history.

(56) References Cited

U.S. PATENT DOCUMENTS 7,159,833 B2 *   1/2007   Kato ...................... 248/349.1

2003/0064688 A1 *   4/2003   Mizuta et al. ................. 455/90
2004/0166907 A1 *   8/2004   Yajima ..................... 455/575.3
2005/0107137 A1 *   5/2005   Byun et al. .............. 455/575.1

* cited by examiner

*Primary Examiner*—Sanh D. Phu
(74) *Attorney, Agent, or Firm*—Rabin & Berdo, PC (57) ABSTRACT

A slidable and automatic rotatable apparatus disposed in a portable electronic device and providing the portable electronic device, which includes a first housing and a second housing, with a first status and a second status is provided. The apparatus includes a third housing, a protruding part disposed on the second housing and opposite to the first track, and a rotary module passing through the second track. The third housing, which is fixed on the first housing and movably connected with the second housing, includes a first track, a second track, and a first rib disposed on a first side of the second track. A first end of the rotary module is fixed on the second housing, while a second end is disposed between the first housing and the third housing. The rotary module has at least one protruding point positioned at the second end for contacting the first rib.

19 Claims, 8 Drawing Sheets

FIG. 5C

SLIDABLE AND AUTOMATIC ROTATABLE APPARATUS

This application claims the benefit of Taiwan application Serial No. 93126262, filed Aug. 31, 2004, the subject matter of which is incorporated herein by reference.

BACKGROUND OF THE INVENTION

1. Field of the Invention

The invention relates in general to a slidable and automatic rotatable apparatus, and more particularly to a slidable and automatic rotatable apparatus providing the portable electronic device with a first status and a second status.

2. Description of the Related Art

Along with the rapid advance in electronic industry in recent years, portable electronic devices such as mobile phone and personal digital assistant (PDA) have become more and more popular.

Take the mobile phone for example. The mobile phone, which enables telecommunication whenever and wherever it is needed, has become an important telecommunication device to consumers. Apart from the basic conversation function, the mobile phone also provides transmission services such as voice mail and text message to encompass a wider range of functions.

For a user, sending/receiving a text message is a frequently used function of a mobile phone. Therefore, whether the input method of a text message is easy or not is directly relevant to the convenience of operation, hence becoming an important factor in purchasing a mobile phone.

The current practice regarding the arrangement of the key pad of a mobile phone is to add letter key function to the number keys of 0~9. For example, the 26 English alphabets A~Z are assigned to 10 number keys. Thus, each of the number keys also denotes at least 3 English alphabets, e.g., the number key '2' also denotes English alphabet 'A', 'B' and 'C'. Since each number key also denote plural English alphabets, when using the number keys input a text message, the user has to press a number key first then pick up the desired English alphabet to be inputted. The more English alphabets to be inputted, the more selections have to be made. This is indeed annoying. Moreover, it is inconvenient for users who are not familiar with the arrange of English alphabet on the number keys to spend a large amount of time searching for the right letters to be inputted

SUMMARY OF THE INVENTION

It is therefore an object of the invention to provide a slidable and automatic rotatable apparatus providing a portable electronic device with a first status and a second status to resolve the problems of inconvenience in input that conventional portable electronic devices would have.

The invention achieves the above object by providing a slidable and automatic rotatable apparatus, which is disposed in a portable electronic device and provides the portable electronic device with a first status and a second status, wherein the portable electronic device comprises a first housing and a second housing. The slidable and automatic rotatable apparatus comprises a third housing, a protruding part and a rotary module. The third housing is fixed on the first housing and movably connected with the second housing. The third housing comprises a first track, a second track and a first rib. The first track has a first position, a second position and a third position, wherein the second position is positioned between the first position and the third position. The second track has a fourth position and a fifth position. The first rib is disposed on a first side of the second track. The protruding part is disposed on the second housing and opposite to the first track. The rotary module passes through the second track. A first end of the rotary module is fixed on the second housing, and a second end of the rotary module is disposed between the first housing and the third housing, while the second end of the rotary module has at least a protruding point in contact with the first rib.

When the portable electronic device is operated under the first status, the protruding part and rotary module are respectively positioned at the first position and the fourth position. When the third housing slides against the second housing and causes the protruding part to slide to the second position from the first position along the first track, the rotary module also slides to the fifth position from the fourth position along the second track, and releases an elasticity force when the rotary module reaches the fifth position, wherein the elasticity force rotates the rotary module and enables the protruding point to push the first rib, so that the protruding part slides to the third position from the second position, and that the third housing moves against the second housing for the portable electronic device to be switched to the second status. When the protruding part slides to the second position from the third position, the protruding part causes the rotary module to rotate at the fifth position for the elasticity force to be stored in the rotary module.

Other objects, features, and advantages of the invention will become apparent from the following detailed description of the preferred but non-limiting embodiments. The following description is made with reference to the accompanying drawings.

DETAILED DESCRIPTION OF THE INVENTION

The slidable and automatic rotatable apparatus of the invention is disposed in a portable electronic device to provide the portable electronic device with a first status and a second status. The embodiment below is exemplified by the apparatus being disposed inside a mobile phone. However, in practical application, the technological characteristics disclosed in the invention can be applied to other portable electronic devices such as a personal digital assistant (PDA). The present embodiment is an embodiment under the spirit of the invention.

Figure 1A:
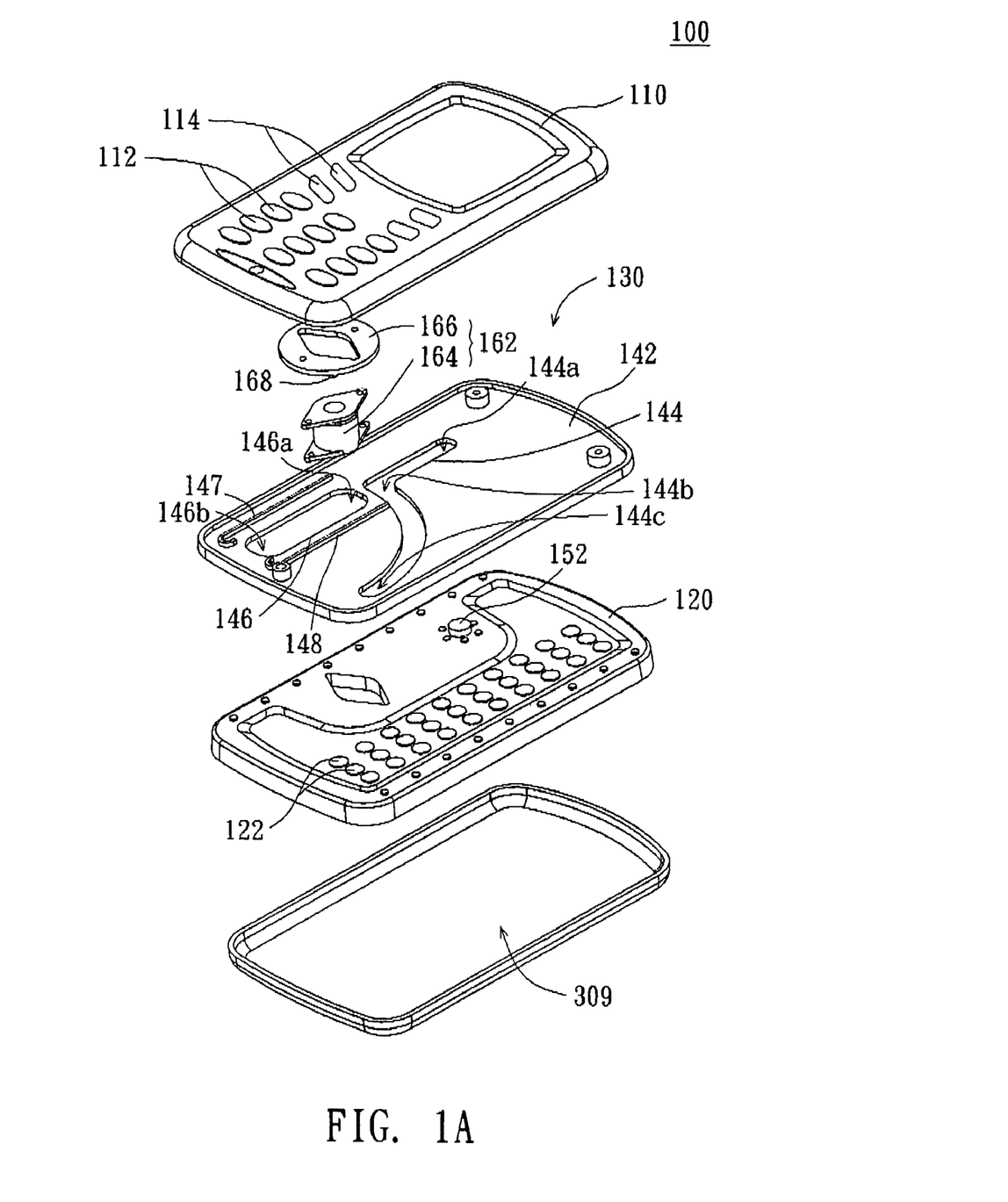
FIG. 1A is a decomposition diagram of a portable electronic device according to a preferred embodiment of the invention.
Figure 1B:
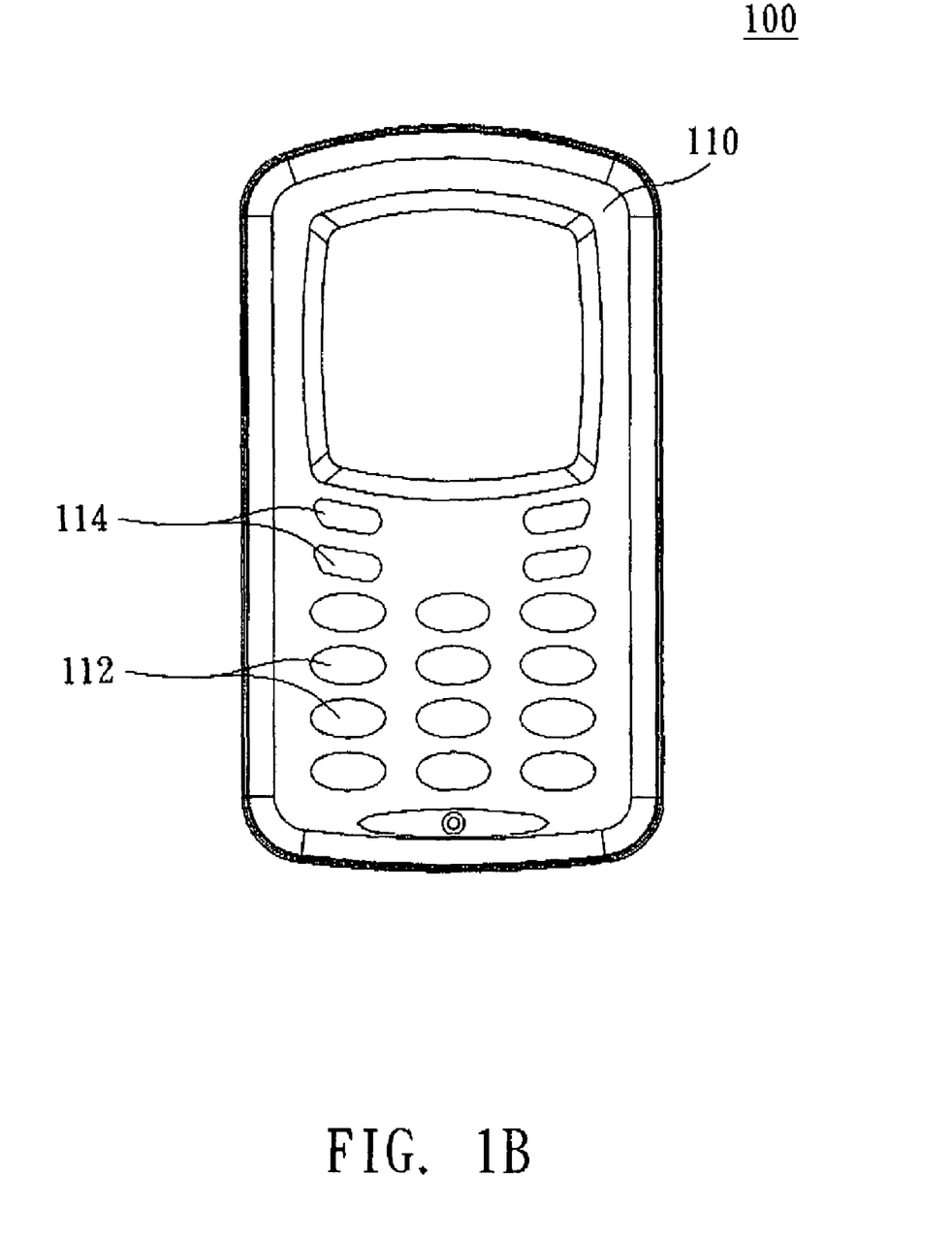
FIG. 1B is an assembly diagram of the portable electronic device of FIG. 1A.

Referring to both FIGS. 1A and FIG. 1B, wherein FIG. 1A is a decomposition diagram of a portable electronic device according to a preferred embodiment of the invention, and FIG. 1B is an assembly diagram of the portable electronic device of FIG. 1A. It can be seen from FIG. 1A that portable electronic device 100 comprises a first housing 110, a second housing 120 and a slidable and automatic rotatable apparatus 130. The first housing 110 has a plurality of number keys 112 and a plurality of application keys 114 disposed thereon. The application key 114 can be simple function keys such as menu, cancel or answer a call. The second housing 120 has a plurality of letter keys 122 disposed thereon. For user's convenience, the arrangement of the letter key 122 is preferably the arrangement of the qwerty keyboard. The portable electronic device 100 preferably further comprises a fourth housing 309 to be coupled with the second housing 120.

The slidable and automatic rotatable apparatus 130 comprises a third housing 142, a rotary module 162 and a protruding part 152. The third housing 142 is fixed on the first housing 110 and is movably connected with the second housing 120. Therefore, when the third housing 142 slides or moves against the second housing 120, the third housing 142 drives and enables the first housing 110 to slide or move against the second housing 120.

The third housing 142 comprises a first track 144, a second track 146, a first rib 147 and a second rib 148. The first track 144, which is disposed corresponding to the protruding part 152, has a first position 144a, a second position 144b and a third position 144c, wherein the second position 144b is positioned between the first position 144a and the third position 144c. The second track 146 has a fourth position 146a and a fifth position 146b. The first rib 147 and the second rib 148 are respectively disposed on the two sides of the second track 146. However, structure of the first track 144 and that of the second track 146 are not limited to the above exemplification. For example, the first track 144 and the second track 146 can be connected together.

Figure 2:
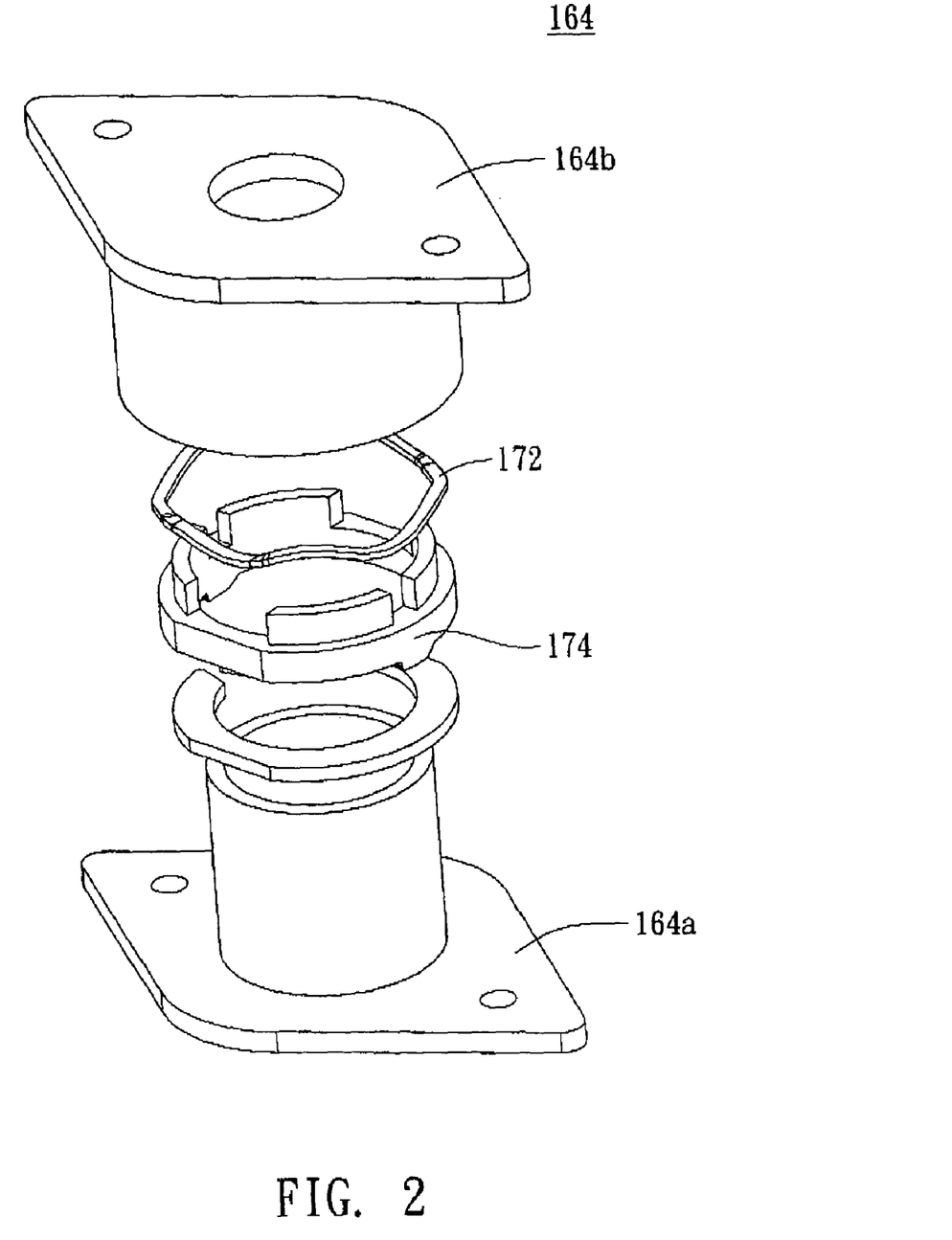
FIG. 2 is a decomposition diagram of the rotary hinge of the portable electronic device of FIG. 1A.

The rotary module 162 comprises a rotary hinge 164 and a movable pulley 166. The structure of the rotary hinge 164 is decomposed in FIG. 2, a decomposition diagram of the rotary hinge of the portable electronic device of FIG. 1A. In FIG. 2, the rotary hinge 164 comprises a first end 164a, a second end 164b, a spring 172 and a cam 174. When the second end 164b rotates against the first end 164a, the cam 174 receives an upward force and compress the spring 172, so that the spring 172 stores an elasticity force. When the second end 164b rotates against the first end 164a to a particular angle, say, 90 degrees, the upward force received by the cam 174 cause the cam 174 to be unstable. Meanwhile, the spring 172 can release the elasticity force stored therein to rotate the cam 174. Refer to FIG. 1A, the movable pulley 166 has a plurality of protruding points 168 in contact with the first rib 147 and the second rib 148 reducing the friction generated when the movable pulley slides. However, no restriction is imposed on the numbers of the protruding points 168 as long as each of the protruding points is capable of being contact with the first rib 147 or the second rib 148 so that the movable pulley 166 can slide along of the first rib 147 and the second rib 148.

Figure 3:
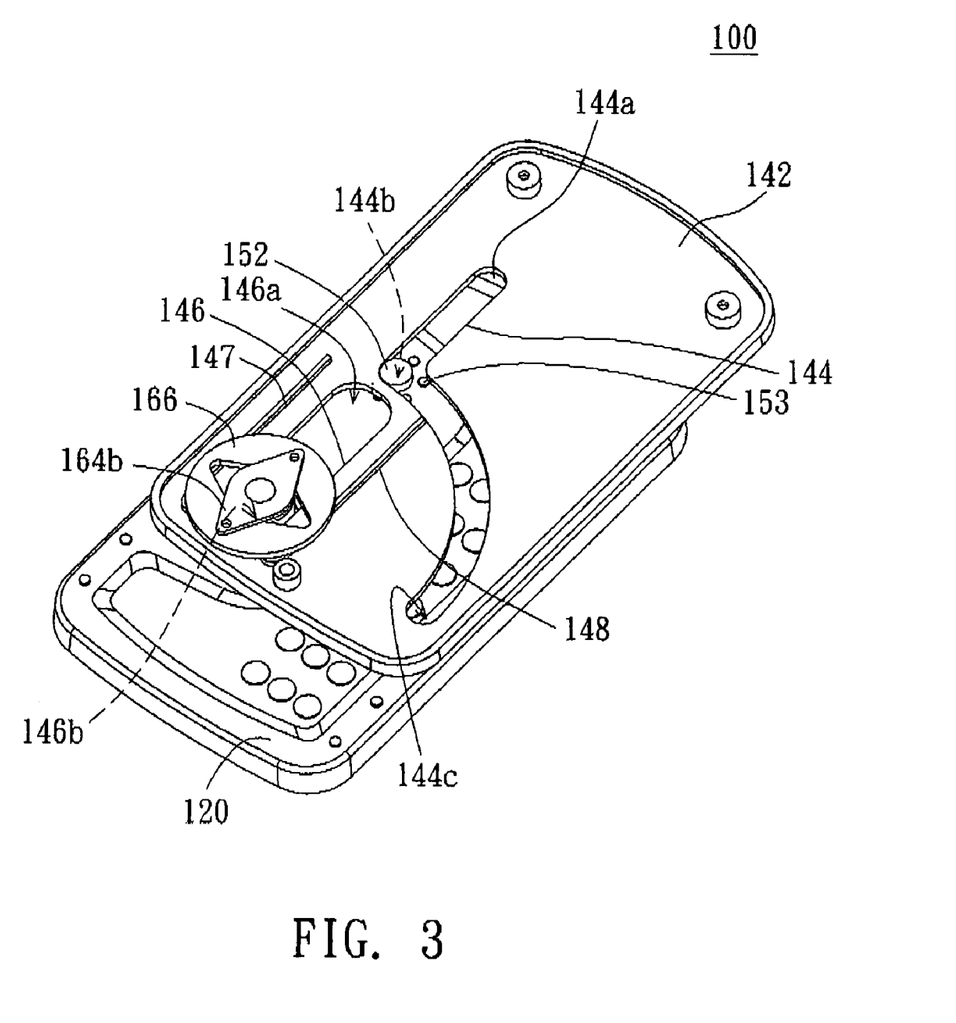
FIG. 3 is a top view when the third housing, rotary module and the second housing of FIG. 1A are assembled.
Figure 4:
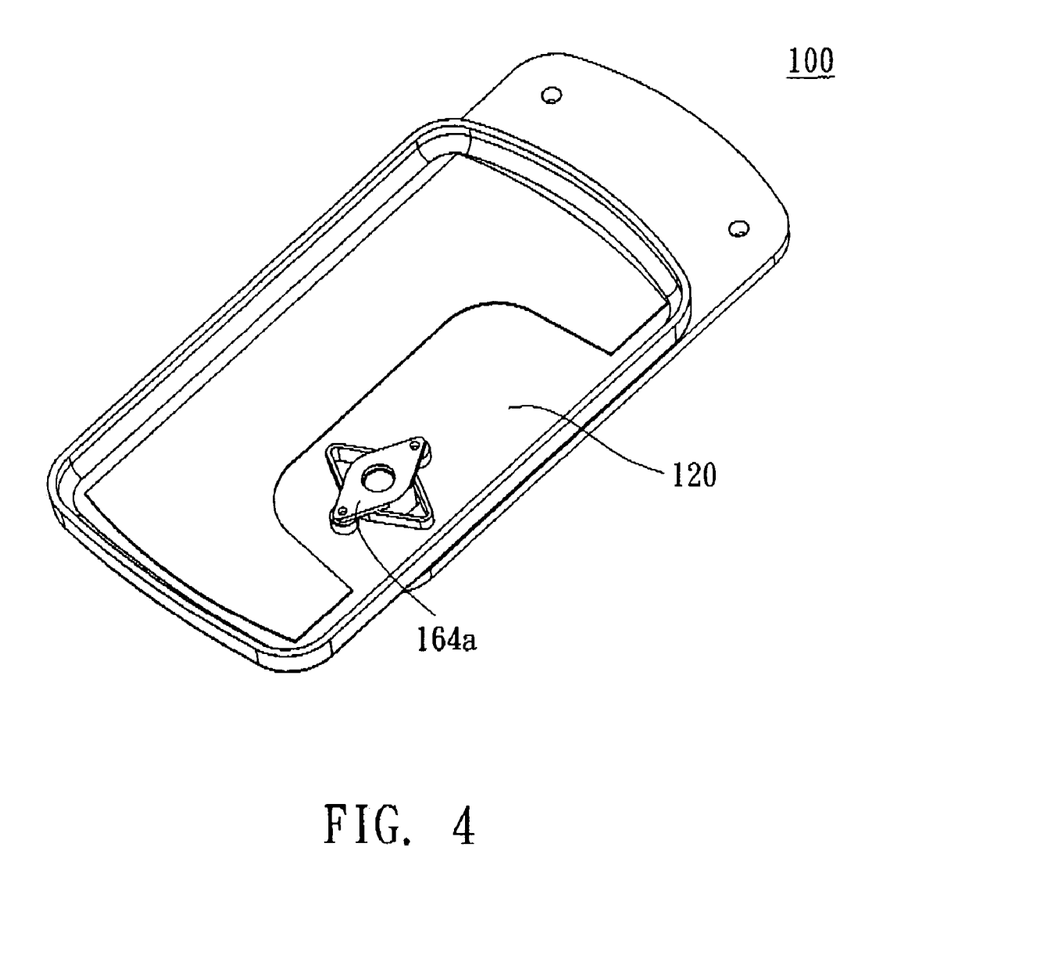
FIG. 4 is a bottom view of FIG. 3.

The connection relationships between elements of the portable electronic device 100 are disclosed in FIG. 1A, FIG. 3 and FIG. 4, wherein FIG. 3 is a top view when the third housing 142, rotary module 162 and the second housing 120 of FIG. 1A are assembled and FIG. 4 is a bottom view of FIG. 3. It can be seen from FIG. 3 that the third housing 142 is movably connected to the second housing 120, the protruding part 152 is disposed on the second housing 120 and opposite to the first track 144, the rotary hinge 164 passes through the second track 146, and the second end 164b of the rotary hinge 164 is disposed between the first housing 110 and the third housing 142, and the movable pulley 166 is disposed between the first end 164a and the second end 164b and is fixed on the second end 164b. To reduce the friction generated when the protruding part 152 slides along the first track 144, a slide booster 153 is preferably disposed on the second housing 120 and positioned in the vicinity of the protruding part 152.

Besides, it can be seen from FIG. 4 that the first end 164a of the rotary hinge 164 is fixed on the second housing 120. The first end 164a and the second housing 120, for example, are jointed via a screw. Therefore, only rotating movement, not sliding movement, is allowed between the rotary hinge 164 and the second housing 120.

It can be seen from the above disclosure that when assembling the portable electronic device 100, by rotating the second end 164b of the rotary hinge 164 against the first end 164a to particular angle for the spring 172 to store an elasticity force and assembling the portable electronic device 100 of FIG. 1A according to the above assembly, an assembled portable electronic device 100 of FIG. 1B is obtained. Meanwhile, the protruding part 152 and the rotary module 162 are respectively positioned at the first position 144a and the fourth position 146a, and the elasticity force stored in the spring 172 is restrained by the first track 144 and cannot be released. Besides, the number keys 112 and the application key 114 disposed on the first housing 100 are exposed for user to operate, but the letter keys 122 disposed on the second housing 120 are hidden underneath the first housing 110, and this status is called the "first status". When the portable electronic device 100 is operated under the first status, the user can use the number keys 112 to dial a telephone number, and use the application keys 114 to operate the basic functions of the portable electronic device 100 such as answering or disconnecting a call or making enquiries.

Figure 5A:
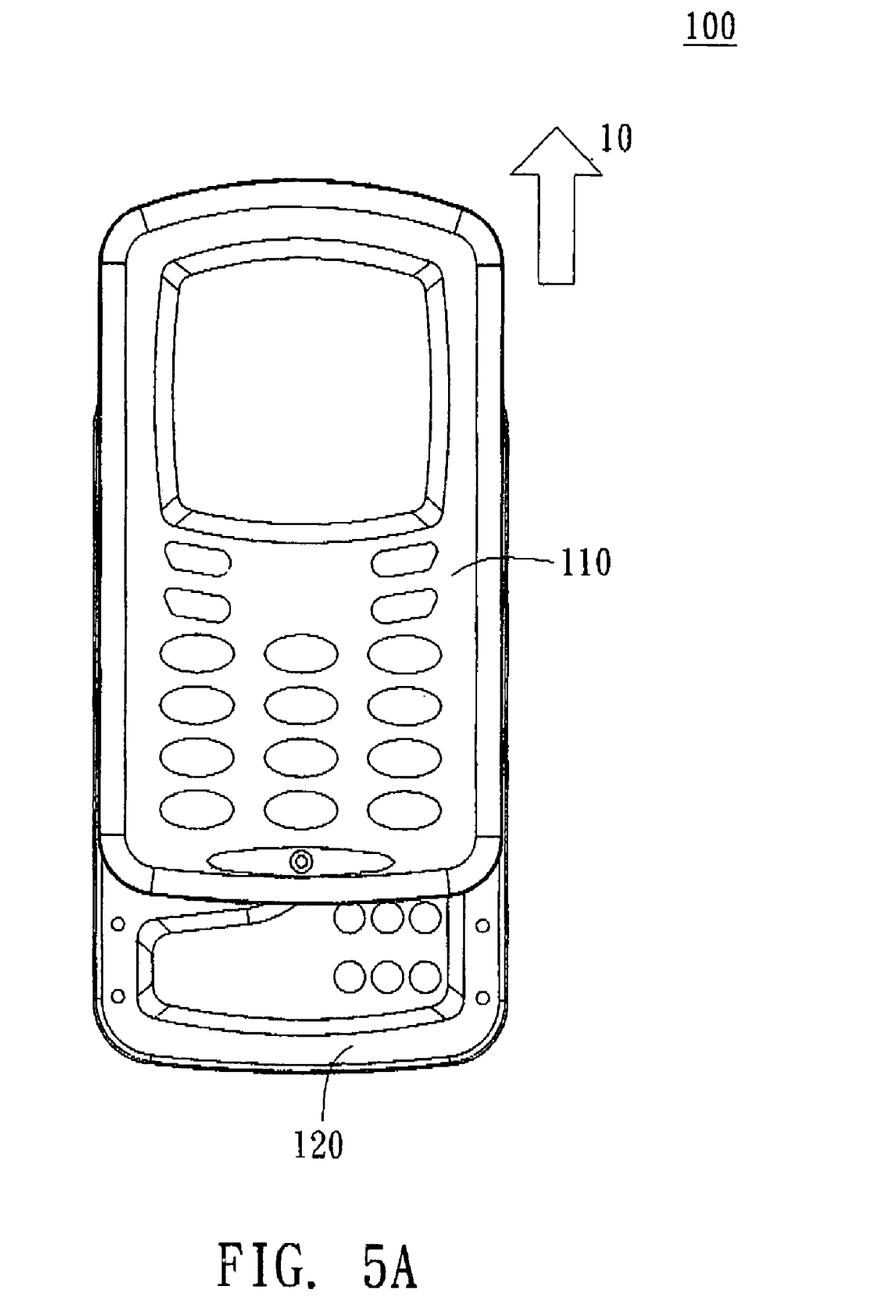
FIGS. 5A-5C are sequential diagrams showing how the portable electronic device of FIG. 1B is switched to the second status from the first status.
Figure 5B:
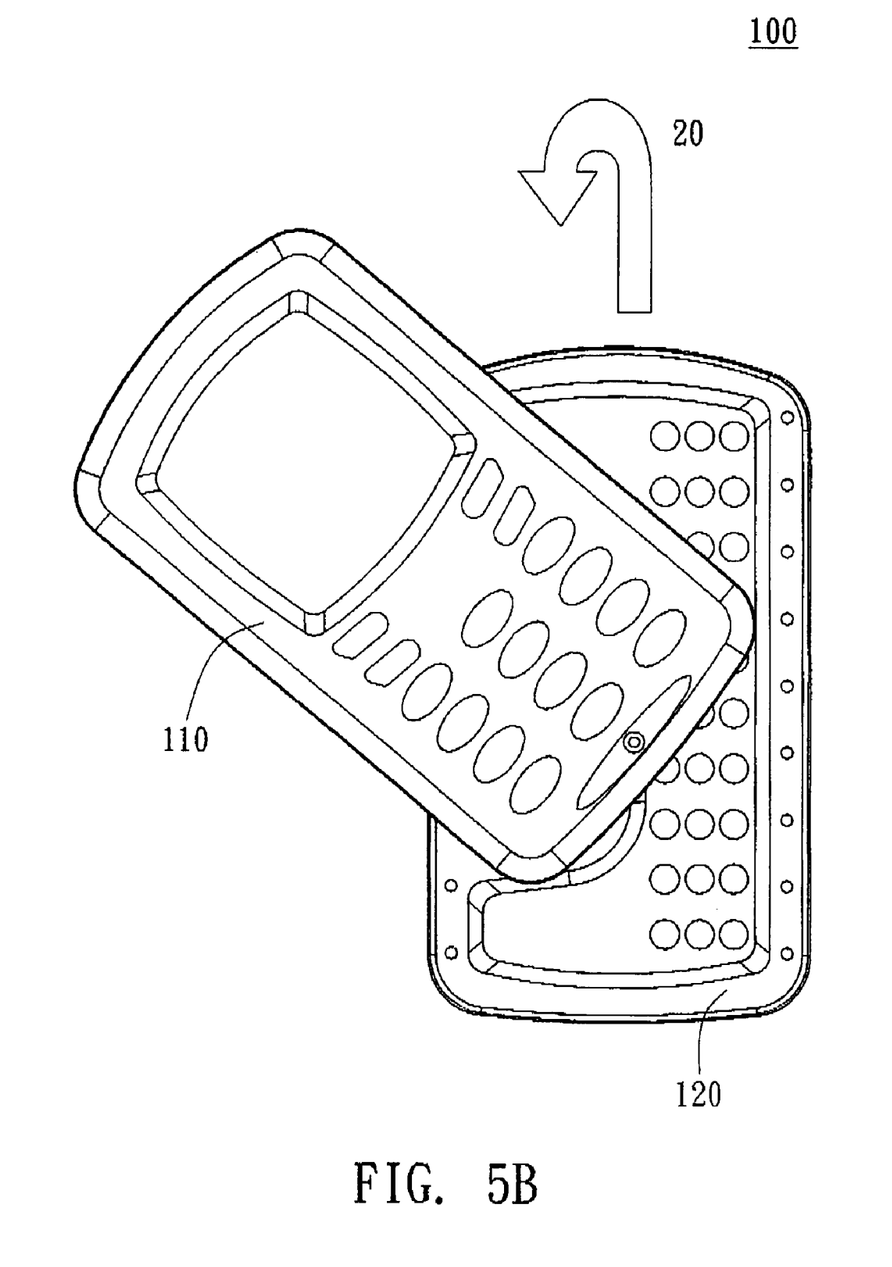
Figure 5C:
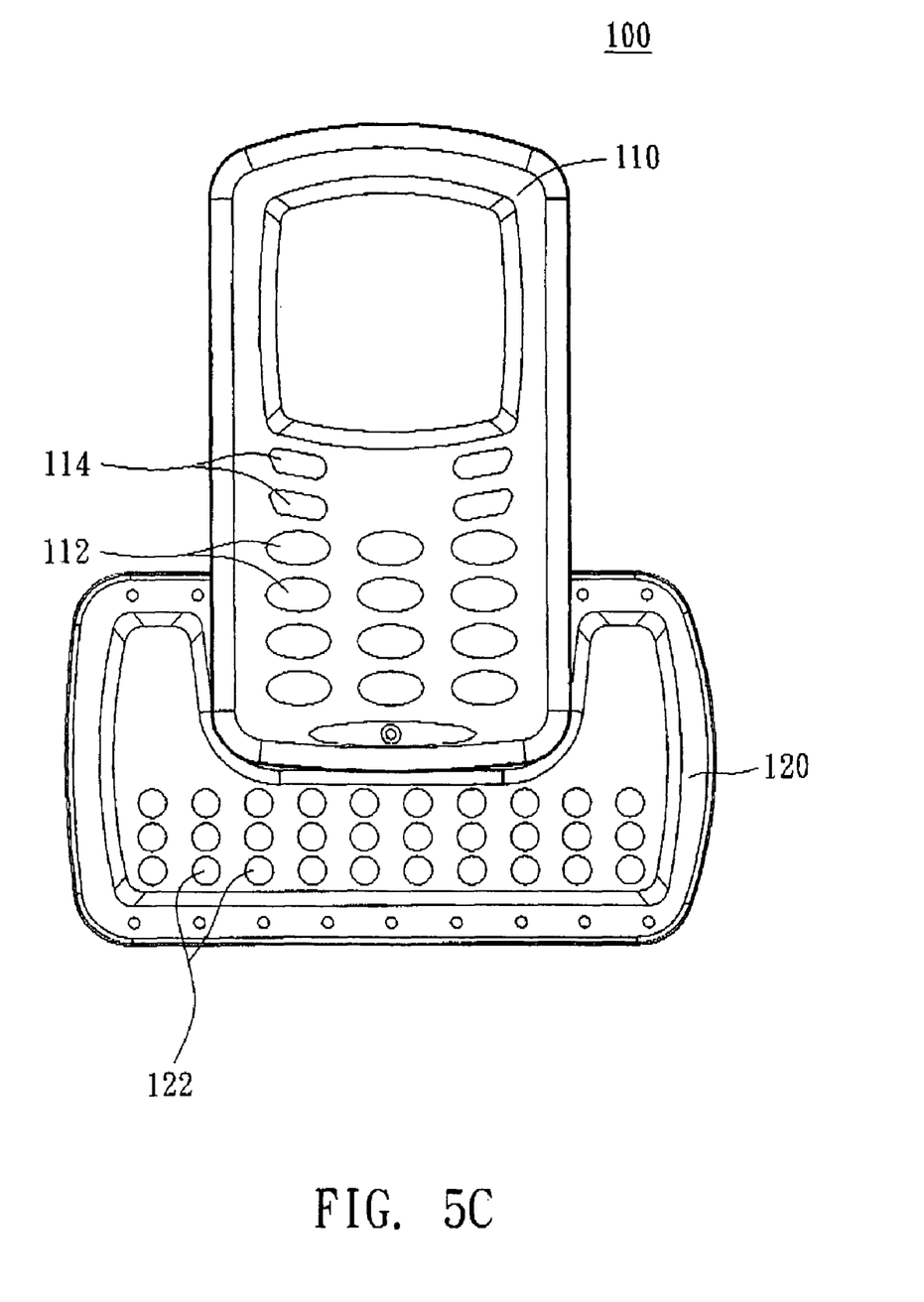

Referring to both FIG. 3 and FIGS. 5A~5C. FIGS. 5A~5C are sequential diagrams showing how the portable electronic device of FIG. 1B is switched to the second status from the first status. Firstly, as shown in FIG. 5A, by applying an external force onto the first housing 110 or the third housing 142 along the direction of the arrow 10, the first housing 110 and the third housing 142 are enabled to slide against the second housing 120, causing the protruding part 152 to slides toward the second position 144b from the first position 144a along the first track 144, and causing the rotary module 162 to slide towards the fifth position 146b from the fourth position 146a along the second track 146.

Since the protruding part 152 can only slide along the first track 144, the relative movement between the third housing 142 and the second housing 120 is restrained by the shape of the first track 144. Therefore, the third housing 142 can only move against the second housing 120 when the protruding part 152 and the rotary module 162 are respectively positioned at the first position 144a and the fourth position 146a, or before the protruding part 152 and the rotary module 162 respectively slide to the second position 144b and the fifth position 146b from the first position 144a and the fourth position 146a along the first track 144 and the second track 146. Consequently, the elasticity force stored in the spring 172 cannot be released for the time being.

When the protruding part 152 slides to the second position 144b from the first position 144a, the rotary module 162 also slides to the fifth position 146b from the fourth position 146a, and when the rotary module 162 reaches the fifth position 146b, the spring 172 disposed inside the rotary module 162 automatically releases the elasticity force stored therein, enabling the cam 174 to rotate. The rotating cam 174 drives the movable pulley 166 to rotate, meanwhile, the protruding point 168 disposed on the movable pulley 166 pushes the first rib 147 and the second rib 148, enabling the first housing 110 to rotate against the second housing 120 as shown in FIG. 5B. When the first housing 110 rotate against the second housing 120 along the direction of the arrow 20, the protruding part 152 from the second position 144b slides towards the third position 144c along the first track 144, while the rotary module 162 still remains positioned at the fifth position 146b.

When the protruding part 152 slides to the third position 144c, the portable electronic device 100 is at the second status as shown in FIG. 5C. Meanwhile, apart from the number keys 112 and the application key 114, the letter key 122 disposed on the second housing 120 is also exposed for the user to operate. Therefore, when the portable electronic device 100 is at the second status, through the number keys 112, the application key 114 and the letter key 122 which are disposed on the first housing 110 and the second housing 120, the user can input text message more efficiently.

That is to say, when the user would like to use the letter key 122 to input a text, the user only need to apply an external force onto the first housing 110, enabling the protruding part 152 and rotary module 162 to respectively slide to the second position 144b and the fifth position 146b from the first position 144a and the fourth position 146a along the first track 144 and the second track 146. The elasticity force stored in the spring 172 is released accordingly, causing the first housing 110 to automatically rotate against the second housing 120 and switch to the second status, which is indeed very convenient.

When the portable electronic device 100 would like to switch to the first status from the second status, the user only need to slide the protruding part 152 from the third position 144c to the first position 144a via the second position 144b. When the protruding part 152 slides to the second position 144b from the third position 144c, the protruding part 152 drives the rotary module 162, enabling the rotary module 162 to rotate on the fifth position 146b, so that the rotary module 162 stores an elasticity force in the spring 172.

Compared with a conventional mobile phone, the portable electronic device of the present embodiment has the design of respectively disposing the number keys and the letter key on the first housing and the second housing, hence avoiding the inconvenience that would occur to the conventional mobile phone when inputting a text message. Besides, the portable electronic device of the present embodiment is capable of switching between the first status and the second status by a slidable and automatic rotatable apparatus according to practical needs, not only increasing operating convenience but also enhancing competitive capacity.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A slidable and automatic rotatable apparatus disposed in a portable electronic device and providing the portable electronic device with a first status and a second status, the portable electronic device having a first housing and a second housing, the apparatus comprising:

a third housing, fixed on the first housing and movably connected with the second housing, the third housing comprising:

a first track, having a first position, a second position and a third position, the second position being positioned between the first position and the third position;

a second track, having a fourth position and a fifth position; and a first rib disposed on a first side of the second track, a protruding part disposed on the second housing and opposite to the first track; and a rotary module passing through the second track, wherein a first end of the rotary module is fixed on the second housing, a second end of the rotary module is disposed between the first housing and the third housing, and the second end of the rotary module has at least a protruding point in contact with the first rib;

wherein when the portable electronic device is operated under the first status, the protruding part and the rotary module are respectively positioned at the first position and the fourth position;

wherein when the third housing slides against the second housing and causes the protruding part to slide to the second position from the first position along the first track, the rotary module also slides to the fifth position from the fourth position along the second track and releases an elasticity force when the rotary module reaches the fifth position, the elasticity force rotates the rotary module and enables the protruding point to push the first rib, so that the protruding part slides to the third position from the second position and that the third housing moves against the second housing, and the portable electronic device is switched to the second status;

wherein when the protruding part slides to the second position from the third position, the protruding part causes the rotary module to rotate at the fifth position so as to store the elasticity force in the rotary module.

2. The apparatus according to claim 1, wherein the rotary module comprises:

a rotary hinge, having a first end and a second end, wherein the first end of the rotary hinge is disposed on the first end of the rotary module, the second end of the rotary hinge is disposed on the second end of the rotary module, and when the rotary module rotates, the second end of the rotary hinge rotates against the first end of the rotary hinge; and a movable pulley, which is disposed between the first end of the rotary hinge and the second end of the rotary hinge and is fixed on the second end of the rotary hinge, wherein the protruding point is disposed on the movable pulley.

3. The apparatus according to claim 1, wherein the third housing further comprises a second rib, which is disposed on a second side of the second track.

4. The apparatus according to claim 1, wherein the apparatus further comprises a slide booster, which is disposed on the second housing and positioned in the vicinity of the protruding part for reducing the friction generated when the protruding part slides.

5. The apparatus according to claim 1, wherein the first track and the second track are connected together.

6. The apparatus according to claim 1, wherein the first housing comprises a plurality of number keys.

7. The apparatus according to claim 1, wherein the first housing further comprises at least an application key.

8. The apparatus according to claim 1, wherein the second housing comprises a plurality of letter keys.

9. The apparatus according to claim 8, wherein the arrangement of the letter keys is practically the same with the arrangement of the qwerty keyboard.

10. The apparatus according to claim 1, wherein the portable electronic device is a mobile phone or a personal digital assistant (PDA).

11. A portable electronic device switchable between a first status and a second status, the device comprising:
- a first housing and a second housing, the second housing having a protruding part;
- a third housing, fixed on the first housing, movably connected with the second housing, and having a first track and a second track, wherein the first track, which is disposed corresponding to the protruding part, has a first position, a second position and a third position with the second position being positioned between the first position and the third position, while the second track, has a fourth position and a fifth position; and
- a rotary module, passing through the second track and being fixed on the second housing and the third housing respectively;
- wherein when the electronic device is operated under the first status, the protruding part and the rotary module are respectively positioned at the first position and the fourth position, meanwhile, an elasticity force is stored in the rotary module, and the release of the elasticity force is restrained by the first track; when the third housing slides against the second housing and causes the rotary module to slide to the fifth position from the fourth position along the second track, the protruding part also slides to the second position from the first position along the first track, and when the protruding part reaches the second position, the rotary module releases the elasticity force and causes the third housing to rotate against the second housing, so that the protruding part slides to the third position from the second position for the electronic device to be switched to the second status;
- wherein when the protruding part slides to the second position from the third position, the protruding part causes the rotary module to rotate at the fifth position for the elasticity force to be stored in the rotary module.

12. The electronic device according to claim 11, wherein the rotary module comprises a rotary hinge.

13. The electronic device according to claim 11, wherein the electronic device further comprises a slide booster, which is disposed the second housing and positioned in the vicinity of the protruding part for reducing the friction generated when the protruding part slides.

14. The electronic device according to claim 11, wherein the first track and the second track are connected together.

15. The electronic device according to claim 11, wherein the first housing comprises a plurality of number keys.

16. The electronic device according to claim 11, wherein the first housing further comprises at least an application key.

17. The electronic device according to claim 11, wherein the second housing comprises a plurality of letter keys.

18. The electronic device according to claim 17, wherein the arrangement of the letter keys is practically the same with the arrangement of the qwerty keyboard.

19. The electronic device according to claim 11, wherein the electronic device is a mobile phone or a personal digital assistant (PDA).

* * * * *